Patented Apr. 25, 1939

2,156,223

UNITED STATES PATENT OFFICE 2,156,223

METHOD OF PRODUCING PECTINLIKE SUBSTANCES

Philip Bliss Myers, Scarsdale, N. Y., assignor to Sardik Incorporated, Jersey City, N. J., a corporation of Delaware No Drawing. Application May 25, 1935, Serial No. 23,453

18 Claims. (Cl. 260—344)

This invention relates to a method of producing a pectin-like substance, which I refer to as synthetic pectin, a product that may be used in the manufacture of jams, jellies and marmalades, just as the natural fruit pectins are now employed. In fact it may be substituted for the natural pectins in all their various uses.

It is well known that when certain organic substances are polymerized the viscosities of their solutions are increased due to the increased size of the molecule. In certain cases and with certain compounds the increase in viscosity depends upon the degree of polymerization so that if the molecule becomes large enough a plastic or even a gummy mass may result, as is the case with certain synthetic resins.

It is also well known that certain organic colloidal compounds may be de-polymerized to such an extent that they are no longer colloidal but crystalloidal in nature. A good example of this phenomenon is the hydrolysis or de-polymerization of the natural pectins with strong mineral acids such as hydrochloric and sulphuric acid. The poly-galacturonic acid, which is the nucleus of the pectin molecule and is colloidal in nature, breaks down into its basic constituent, galacturonic acid, which is no longer colloidal but crystalloidal in nature. The unhydrolyzed pectin has a high viscosity while the galacturonic acid imparts practically no viscosity to water.

According to the literature, the general conception of the pectin molecule is that it consists of four molecules of galacturonic acid in ring formation, with the carboxyls of the acid group free and available for methyl ester formation. There is some difference in opinion as to whether two or three of these carboxyl groups are methylated. Attached to this ring through a glucosidal linkage is one molecule of arabinose and one molecule of galactose. Two acetyl groups are also attached to the ring.

The general conception is that the jellying power of the pectin depends upon the degree of esterification of the carboxyl groups. Very little work has been done on the importance of the arabinose, galactose and acetyl groups on the jellying power of the pectin. However, I have found that these compounds are not necessary to jelly formation; further that the jellying power of a pectin depends upon the size of the molecule or degree of polymerization rather than upon its degree of esterification. Since de-polymerization usually accompanies de-esterification the loss of jellying power has wrongly been attributed to de-esterification. Consequently, if all of the arabinose, galactose, acetyl and methoxyl groups could be split off from the polygalacturonic acid without de-polymerization a pectin of high jellying power would be obtained.

It has further been found that the pectin molecule in the unhydrolyzed condition contains eight molecules of galacturonic acid instead of four. That is, it consists of two molecules of tetra-galacturonic acid in ring formation.

It is also well known that the jellying power of a pectin may be measured, within certain limits, by its viscosity. I have found that the decrease in the jellying power of a pectin due to prolonged heating of the pectin solution at elevated temperatures is accompanied by a decrease in the viscosity of the solution both of which are due mainly to the breaking down or de-polymerization of the octa-galacturonic acid into smaller molecules.

I have discovered that I can produce a pectin-like substance which I refer to as synthetic pectin, by subjecting such a material as a uronic acid, or its anhydride, to polymerization, to condense together or polymerize smaller molecules into larger molecules with the elimination of water, forming eventually the octa-uronic acid.

Any uronic acid or its anhydride may be used. I prefer glucuronic or galacturonic acid. Either one of these acids may be polymerized into their corresponding octa-acids. The di- and tetra-acids may also be used to produce the same compound, requiring four and two molecules respectively to produce one molecule of the octa-acid. It should also be understood that mixtures of the uronic acids may also be used to produce the same compound.

Assuming, for example, that glucuronic acid is used as a starting material in the preparation of synthetic pectin in accordance with the present invention, I combine with the glucuronic acid a suitable catalyst, such as platinum black, zinc dust or zinc chloride. For example, I mix with the glucuronic acid 1% to 2% by weight of zinc chloride. The materials are then placed in a reaction chamber, which is preferably evacuated to a vacuum of 26 to 27 inches, the best results being obtained with the highest vacuum. The chamber is heated to approximately 235° C. for from 2 to 3 hours, after which it is cooled, the vacuum broken and the mass washed in an alcohol bath, containing approximately 70% alcohol, with an agent such as hydrochloric acid to extract the zinc chloride, or zinc dust when it is used, from the mass. Approximately 10 c. c. normal hydrochloric acid per liter of alcohol is sufficient. The alcohol has the effect of removing the lower polymers of glucuronic acid, which have no jelly-forming properties and it also serves to leach out the platinum black from the mass when this catalyst is used.

Although the entire operation is continuous and is completed in a single treatment, it occurs in successive steps, the first of which is the formation of a lactone or anhydroglucuronic acid from the original glucuronic acid. Although glucuronic acid is itself difficult to polymerize, I have found that if it is transformed into a lactone the polymerizing reaction is readily accomplished, being in fact quite vigorous under certain conditions. This lactone, anhydroglucuronic acid, is formed by heating the glucuronic acid under vacuum. Although the exact structural formula for anhydroglucuronic acid is not known, the following is the most likely, and the reaction producing the lactone and the structural arrangement can be shown as follows:

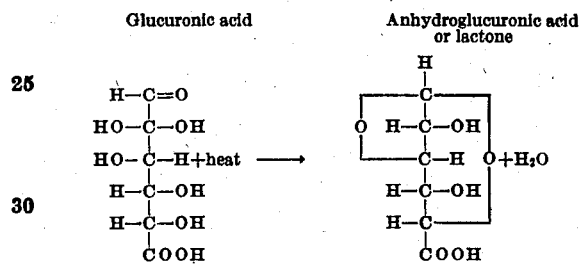

The lactone is very active when heated in the presence of a catalyst such, for example, as the zinc chloride, and polymerizes to form the octa-acid which comprises synthetic pectin. A part of this reaction may be shown as follows:

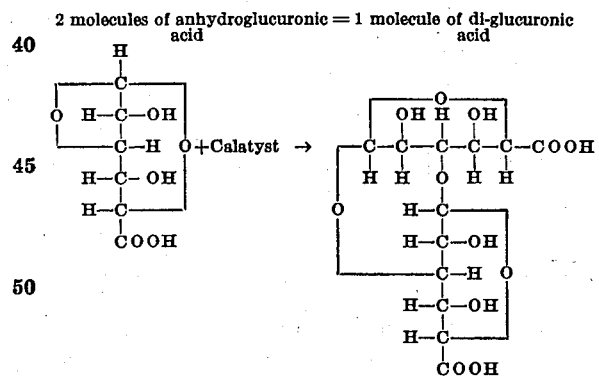

Presumably, 4 molecules of the di-acid combine to form the octa-acid, although an intermediate step may be the momentary formation of the tetra-acid.

If desired, the polymerizing operation may be accomplished at atmospheric pressure or at an elevated pressure.

The octa-acid may be esterified without departing from the scope of this invention. However, the process of esterification usually results in some loss in jellying power of the product due to a partial depolymerization of the octa-acid.

I claim:

1. The process of making synthetic pectin which consists in heating the lactone of a uronic acid sufficiently under vacuum and in the presence of a catalyst taken from the group consisting of platinum black, zinc dust, or zinc chloride to form octa-uronic acid.

2. The process of making synthetic pectin which consists in polymerizing a uronic acid by heating to approximately 235° C. in the presence of a catalyst taken from the group consisting of platinum black, zinc dust, or zinc chloride.

3. The process of making synthetic pectin which consists in polymerizing a uronic acid by heating under vacuum to approximately 235° C. in the presence of a catalyst taken from the group consisting of platinum black, zinc dust or zinc chloride.

4. The process of making synthetic pectin, which consists in heating the lactone of a uronic acid to approximately 235° C. in the presence of 1% to 2% by weight of zinc chloride to form an octa-uronic acid.

5. The process of making synthetic pectin, which consists in heating the lactone of a uronic acid to approximately 235° C. in the presence of 1% to 2% by weight of zinc chloride to form an octa-uronic acid, and washing the product in an alcohol bath containing hydrochloric acid.

6. The process of making synthetic pectin, which consists in heating glucuronic acid to approximately 235° C. in the presence of a catalyst taken from the group consisting of platinum black, zinc dust or zinc chloride to form octa-glucuronic acid.

7. The process of making synthetic pectin, which consists in heating glucuronic acid to approximately 235° C. in the presence of 1% to 2% by weight of zinc chloride to form octa-glucuronic acid.

8. The process of making synthetic pectin, which consists in heating glucuronic acid to approximately 235° C. in the presence of 1% to 2% by weight of zinc chloride to form octa-glucuronic acid and washing the product in an alcohol bath containing hydrochloric acid.

9. The process of making synthetic pectin which consists of forming the lactone of a uronic acid and heating to approximately 235° C. in the presence of a catalyst taken from the group consisting of platinum black, zinc dust or zinc choride to produce octa-uronic acid.

10. The process of making synthetic pectin which consists in heating glucuronic acid sufficiently under vacuum and in the presence of a catalyst taken from the group consisting of platinum black, zinc dust, or zinc chloride to form octa-uronic acid, and extracting the catalyst therefrom.

11. The process of making synthetic pectin which consists in heating the lactone of a uronic acid to approximately 235° C. in the presence of a catalyst taken from the group consisting of platinum black, zinc dust, or zinc chloride, to form an octa-uronic acid, and extracting the catalyst therefrom.

12. The process of making synthetic pectin, which consists in heating the lactone of a uronic acid to approximately 235° C. in the presence of 1 to 2% by weight of zinc dust to form an octa-uronic acid.

13. The process of making synthetic pectin, which consists in heating the lactone of a uronic acid to approximately 235° C. in the presence of 1 to 2% by weight of zinc dust to form an octa-uronic acid, and extracting the catalyst therefrom.

14. The process of making synthetic pectin which consists in heating glucuronic acid to approximately 235° C. in the presence of 1 to 2% by weight of zinc dust to form octa-glucuronic acid.

15. The process of making synthetic pectin which consists in heating glucuronic acid to approximately 235° C. in the presence of 1 to 2% by weight of zinc dust to form octa-uronic acid, and extracting the catalyst therefrom.

16. The process of making synthetic pectin which consists in heating the lactone of a uronic acid to approximately 235° C. in the presence of 1 to 2% by weight of platinum black to form an octa-uronic acid.

17. The process of making synthetic pectin which consists in heating glucuronic acid to about 235° C. in the presence of 1 to 2% by weight of platinum black, and then extracting the catalyst therefrom.

18. That step in the process of making synthetic pectin which consists in heating glucuronic acid under vacuum to form a lactone or anhydroglucuronic acid.

PHILIP BLISS MYERS.